(12) United States Patent
Saha et al.

(10) Patent No.: US 12,394,028 B2
(45) Date of Patent: Aug. 19, 2025

(54) SYSTEM AND METHOD WITH MASKING AND INPAINTING STRATEGY FOR GENERIC DEFENSE AGAINST PATCH ATTACKS

(71) Applicant: Robert Bosch GmbH, Stuttgart (DE)

(72) Inventors: Aniruddha Saha, Elkridge, MD (US); Chaithanya Kumar Mummadi, Pittsburgh, PA (US); Wan-Yi Lin, Wexford, PA (US); Filipe Condessa, Pittsburgh, PA (US)

(73) Assignee: Robert Bosch GmbH, Stuttgart (DE)

( * ) Notice: Subject to any disclaimer, the term of this patent is extended or adjusted under 35 U.S.C. 154(b) by 423 days.

(21) Appl. No.: 17/949,003

(22) Filed: Sep. 20, 2022

(65) Prior Publication Data

US 2024/0095891 A1 Mar. 21, 2024

(51) Int. Cl.
*G06T 5/77* (2024.01)
*G06T 7/11* (2017.01)
*G06V 10/25* (2022.01)
*G06V 10/74* (2022.01)

(52) U.S. Cl.
CPC .................. *G06T 5/77* (2024.01); *G06T 7/11* (2017.01); *G06V 10/25* (2022.01); *G06V 10/761* (2022.01)

(58) Field of Classification Search
CPC .. G06T 5/77; G06T 7/11; G06V 10/25; G06V 10/761
USPC ........................................................ 382/254
See application file for complete search history.

(56) References Cited

U.S. PATENT DOCUMENTS

| | | | |
|---|---|---|---|
| 11,875,489 B2 * | 1/2024 | Fan | G06V 20/58 |
| 12,033,307 B2 * | 7/2024 | Tang | G06T 7/11 |
| 2022/0292650 A1 * | 9/2022 | Amirghodsi | G06N 3/096 |
| 2024/0005173 A1 * | 1/2024 | Lomuscio | G06N 3/10 |

OTHER PUBLICATIONS

Liu et al., "Segment and Complete: Defending Object Detectors Against Adversarial Patch Attacks with Robust Patch Detection," arXiv:2112.04532v1, Dec. 8, 2021, pp. 1-24.
Xu et al., "PatchZero: Defending Against Adversarial Patch Attacks by Detecting and Zeroing the Patch," arXiv:2207.01795v3, Sep. 5, 2022, pp. 1-10.

(Continued)

*Primary Examiner* — Neil R McLean
(74) *Attorney, Agent, or Firm* — Kathy Takeguchi; Maginot, Moore & Beck LLP

(57) ABSTRACT

A system and method include dividing a source image into a plurality of source regions, which are portions of the source image that correspond to a plurality of grid regions. A mask is used to create a first masked region that masks a first source region and a first unmasked region that comprises a second source region. A first inpainted region is generated by inpainting the first masked region based on the second source region. Similarity data is generated based on a similarity assessment. A protected image is generated that includes at least (i) the first masked region at a first grid region when the similarity data indicates that the first source region is not similar to the first inpainted region and (ii) the first inpainted region at the first grid region when the similarity data indicates that the first source region is similar to the first inpainted region.

20 Claims, 7 Drawing Sheets

(56) References Cited

OTHER PUBLICATIONS

Doan et al., "TnT Attacks! Universal Naturalistic Adversarial Patches Against Deep Neural Network Systems," arXiv:2111.09999v2, Jul. 26, 2022, pp. 1-18.
Saharia et al., "Palette: Image-to-Image Diffusion Models," arXiv:2111.05826v2, May 3, 2022, pp. 1-29.

* cited by examiner

1ST ROUND OF DEFENSE

SOURCE IMAGE WITH GRID → SOURCE IMAGE WITH MASK 1 → SOURCE IMAGE WITH INPAINTED REGIONS → 1ST PROTECTED IMAGE

| $x_1$ | $x_2$ | $x_3$ | $x_4$ | $x_5$ |
|---|---|---|---|---|
| $x_6$ | $x_7$ | $x_8$ | $x_9$ | $x_{10}$ |
| $x_{11}$ | $x_{12}$ | $x_{13}$ | $x_{14}$ | $x_{15}$ |
| $x_{16}$ | $x_{17}$ | $x_{18}$ | $x_{19}$ | $x_{20}$ |
| $x_{21}$ | $x_{22}$ | $x_{23}$ | $x_{24}$ | $x_{25}$ |

| $x_1$ | $x_2$ | $x_3$ | $x_4$ | $x_5$ |
|---|---|---|---|---|
| $x_6$ | $x_7$ | $x_8$ | $x_9$ | $x_{10}$ |
| $x_{11}$ | $x_{12}$ | $x_{13}$ | $x_{14}$ | $x_{15}$ |
| $x_{16}$ | $x_{17}$ | $x_{18}$ | $x_{19}$ | $x_{20}$ |
| $x_{21}$ | $x_{22}$ | $x_{23}$ | $x_{24}$ | $x_{25}$ |

| $y_1$ | $x_2$ | $y_3$ | $x_4$ | $y_5$ |
|---|---|---|---|---|
| $x_6$ | $y_7$ | $x_8$ | $y_9$ | $x_{10}$ |
| $y_{11}$ | $x_{12}$ | $y_{13}$ | $x_{14}$ | $y_{15}$ |
| $x_{16}$ | $y_{17}$ | $x_{18}$ | $y_{19}$ | $x_{20}$ |
| $y_{21}$ | $x_{22}$ | $y_{23}$ | $x_{24}$ | $y_{25}$ |

| $z_1$ | $x_2$ | $z_3$ | $x_4$ | $z_5$ |
|---|---|---|---|---|
| $x_6$ | $z_7$ | $x_8$ | $z_9$ | $x_{10}$ |
| $z_{11}$ | $x_{12}$ | $z_{13}$ | $x_{14}$ | $z_{15}$ |
| $x_{16}$ | $z_{17}$ | $x_{18}$ | $z_{19}$ | $x_{20}$ |
| $z_{21}$ | $x_{22}$ | $z_{23}$ | $x_{24}$ | $z_{25}$ |

2ND ROUND OF DEFENSE

1ST PROTECTED IMAGE WITH GRID → 1ST PROTECTED IMAGE WITH MASK 2 → 1ST PROTECTED IMAGE WITH INPAINTED REGIONS → 2ND PROTECTED IMAGE

| $z_1$ | $x_2$ | $z_3$ | $x_4$ | $z_5$ |
|---|---|---|---|---|
| $x_6$ | $z_7$ | $x_8$ | $z_9$ | $x_{10}$ |
| $z_{11}$ | $x_{12}$ | $z_{13}$ | $x_{14}$ | $z_{15}$ |
| $x_{16}$ | $z_{17}$ | $x_{18}$ | $z_{19}$ | $x_{20}$ |
| $z_{21}$ | $x_{22}$ | $z_{23}$ | $x_{24}$ | $z_{25}$ |

| $z_1$ | $x_2$ | $z_3$ | $x_4$ | $z_5$ |
|---|---|---|---|---|
| $x_6$ | $z_7$ | $x_8$ | $z_9$ | $x_{10}$ |
| $z_{11}$ | $x_{12}$ | $z_{13}$ | $x_{14}$ | $z_{15}$ |
| $x_{16}$ | $z_{17}$ | $x_{18}$ | $z_{19}$ | $x_{20}$ |
| $z_{21}$ | $x_{22}$ | $z_{23}$ | $x_{24}$ | $z_{25}$ |

| $z_1$ | $y_2$ | $z_3$ | $y_4$ | $z_5$ |
|---|---|---|---|---|
| $y_6$ | $z_7$ | $y_8$ | $z_9$ | $y_{10}$ |
| $z_{11}$ | $y_{12}$ | $z_{13}$ | $y_{14}$ | $z_{15}$ |
| $y_{16}$ | $z_{17}$ | $y_{18}$ | $z_{19}$ | $y_{20}$ |
| $z_{21}$ | $y_{22}$ | $z_{23}$ | $y_{24}$ | $z_{25}$ |

| $z_1$ | $z_2$ | $z_3$ | $z_4$ | $z_5$ |
|---|---|---|---|---|
| $z_6$ | $z_7$ | $z_8$ | $z_9$ | $z_{10}$ |
| $z_{11}$ | $z_{12}$ | $z_{13}$ | $z_{14}$ | $z_{15}$ |
| $z_{16}$ | $z_{17}$ | $z_{18}$ | $z_{19}$ | $z_{20}$ |
| $z_{21}$ | $z_{22}$ | $z_{23}$ | $z_{24}$ | $z_{25}$ |

$x_i$ = SOURCE REGION WITH SOURCE CONTENT OF THE SOURCE IMAGE AT THE ith GRID REGION $x_i$ = MASKED REGION THAT MASKS THE SOURCE REGION AT THE ith GRID REGION $y_i$ = INPAINTED REGION WITH INPAINTED CONTENT AT THE ith GRID REGION $z_i$ = PROTECTED REGION (MASKED/INPAINTED REGION) AT THE ith GRID REGION

SYSTEM AND METHOD WITH MASKING AND INPAINTING STRATEGY FOR GENERIC DEFENSE AGAINST PATCH ATTACKS

GOVERNMENT RIGHTS

At least one or more portions of this invention may have been made with government support under U.S. Government Contract No. 1190060-430433 awarded by Defense Advanced Research Projects Agency (DARPA) in association with its program of Guaranteeing AI Robustness against Deception (GARD). The U.S. Government may therefore have certain rights in this invention.

TECHNICAL FIELD

This disclosure relates generally to digital image processing, and more particularly to processing digital images to defend against patch attacks.

BACKGROUND

Empirical defenses against adversarial patch attacks tend to focus on determining whether and where an adversarial patch is located on the image and replacing those pixels of the estimated location with non-adversarial pixels to reduce influences of the adversarial patch. In this regard, there are some empirical defenses that rely on identifying high-frequency or unnatural patterns to detect adversarial patches. However, there have been some recent advances on patch attacks, which take these empirical defenses into account and which make adversarial patches more realistic and perceptually similar to natural objects to avoid detection. Also, there are some empirical defenses that rely on creating adversarial patches and training a patch detector based on these adversarial patches. However, these empirical defenses rely heavily on hyperparameters of the patch detector during training and are thus computationally expensive, as well as easier to be attacked if the adversarial patches, which are created and used for training, do not cover all possible worst-case patterns.

SUMMARY

The following is a summary of certain embodiments described in detail below. The described aspects are presented merely to provide the reader with a brief summary of these certain embodiments and the description of these aspects is not intended to limit the scope of this disclosure. Indeed, this disclosure may encompass a variety of aspects that may not be explicitly set forth below.

According to at least one aspect, a computer-implemented method relates to defending against adversarial patch attacks. The method includes obtaining a source image. The method includes dividing the source image into a plurality of source regions using a grid with a plurality of grid regions. The plurality of source regions are portions of the source image that correspond to the plurality of grid regions. The method includes generating, via a first mask, a first masked region that masks a first source region and a first unmasked region that corresponds to a second source region. The method includes generating a first inpainted region by inpainting the first masked region based at least on the second source region. The method includes generating first similarity data indicative of a similarity assessment between the first source region and the first inpainted region. The method includes generating a protected image that includes at least (i) the first masked region at a first grid region in response to the similarity data indicating that the first source region is not similar to the first inpainted region and (ii) the first inpainted region at the first grid region in response to the similarity data indicating that the first source region is similar to the first inpainted region.

According to at least one aspect, a system includes a processor and a memory. The memory is in data communication with the processor. The memory has computer readable data including instructions stored thereon that, when executed by the processor, cause the processor to perform a method for defending against adversarial patch attacks. The method includes obtaining a source image. The method includes dividing the source image into a plurality of source regions using a grid with a plurality of grid regions. The plurality of source regions are portions of the source image that correspond to the plurality of grid regions. The method includes generating, via a first mask, a first masked region that masks a first source region and a first unmasked region that corresponds to a second source region. The method includes generating a first inpainted region by inpainting the first masked region based at least on the second source region. The method includes generating first similarity data indicative of a similarity assessment between the first source region and the first inpainted region. The method includes generating a protected image that includes at least (i) the first masked region at a first grid region in response to the similarity data indicating that the first source region is not similar to the first inpainted region and (ii) the first inpainted region at the first grid region in response to the similarity data indicating that the first source region is similar to the first inpainted region.

According to at least one aspect, a non-transitory computer readable medium has computer readable data including instructions stored thereon that, when executed by a processor, cause the processor to perform a method for defending against patch attacks. The method includes obtaining obtaining a source image. The method includes dividing the source image into a plurality of source regions using a grid with a plurality of grid regions. The plurality of source regions are portions of the source image that correspond to the plurality of grid regions. The method includes generating, via a first mask, a first masked region that masks a first source region and a first unmasked region that corresponds to a second source region. The method includes generating a first inpainted region by inpainting the first masked region based at least on the second source region. The method includes generating first similarity data indicative of a similarity assessment between the first source region and the first inpainted region. The method includes generating a protected image that includes at least (i) the first masked region at a first grid region in response to the similarity data indicating that the first source region is not similar to the first inpainted region and (ii) the first inpainted region at the first grid region in response to the similarity data indicating that the first source region is similar to the first inpainted region.

These and other features, aspects, and advantages of the present invention are discussed in the following detailed description in accordance with the accompanying drawings throughout which like characters represent similar or like parts.

DETAILED DESCRIPTION

The embodiments described herein, which have been shown and described by way of example, and many of their advantages will be understood by the foregoing description, and it will be apparent that various changes can be made in the form, construction, and arrangement of the components without departing from the disclosed subject matter or without sacrificing one or more of its advantages. Indeed, the described forms of these embodiments are merely explanatory. These embodiments are susceptible to various modifications and alternative forms, and the following claims are intended to encompass and include such changes and not be limited to the particular forms disclosed, but rather to cover all modifications, equivalents, and alternatives falling with the spirit and scope of this disclosure.

Figure 1:
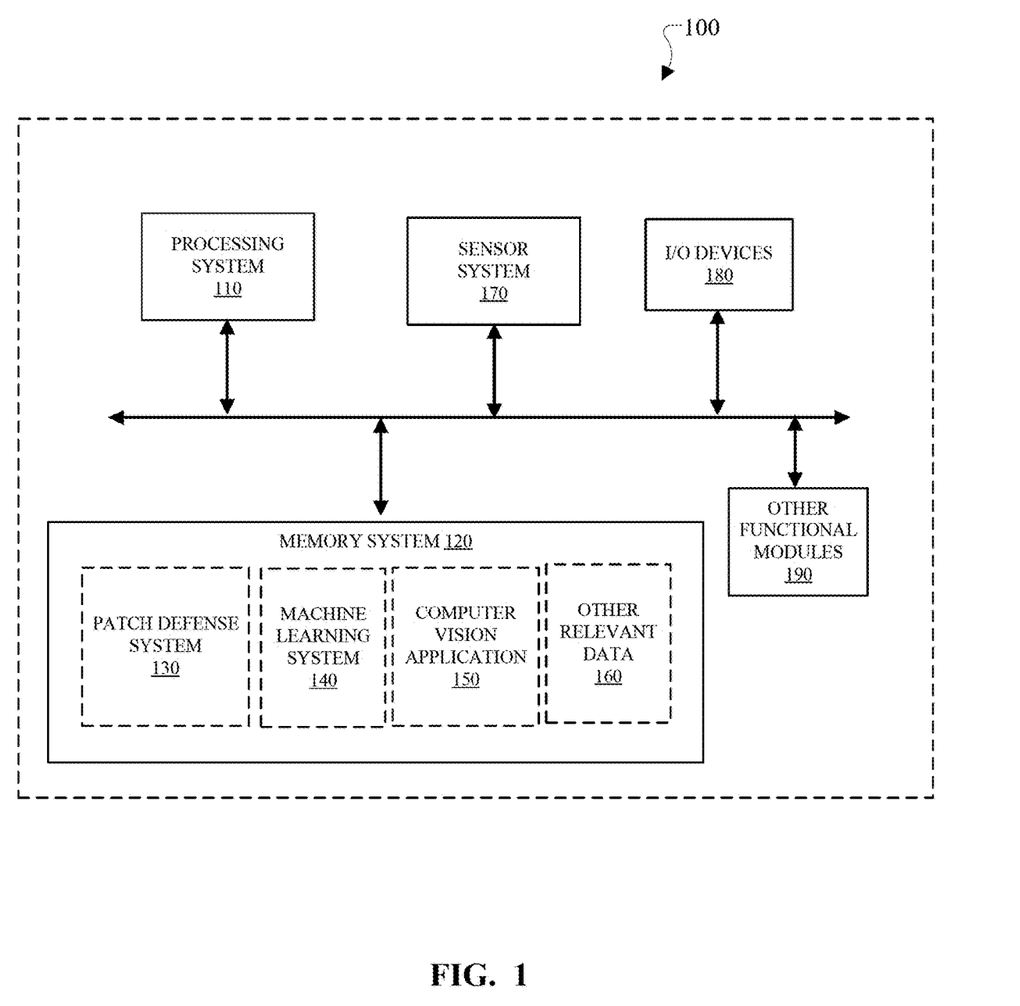
FIG. 1 is a block diagram of an example of a system that includes a patch defense system to defend against patch attacks according to an example embodiment of this disclosure.

FIG. 1 is a diagram of a non-limiting example of a system 100, which is configured to defend against adversarial patch attacks. The system 100 is configured to receive an input image and generate an output image, which is protected and which is ensured to contain at least a set of grid regions with non-adversarial pixels. The system 100 includes at least a processing system 110 with at least one processing device. For example, the processing system 110 includes at least an electronic processor, a central processing unit (CPU), a graphics processing unit (GPU), a microprocessor, a field-programmable gate array (FPGA), an application-specific integrated circuit (ASIC), any suitable processing technology, or any number and combination thereof. The processing system 110 is operable to provide the functionality as described herein.

The system 100 includes a memory system 120, which is operatively connected to the processing system 110. In an example embodiment, the memory system 120 includes at least one non-transitory computer readable storage medium, which is configured to store and provide access to various data to enable at least the processing system 110 to perform the operations and functionality, as disclosed herein. In an example embodiment, the memory system 120 comprises a single memory device or a plurality of memory devices. The memory system 120 can include electrical, electronic, magnetic, optical, semiconductor, electromagnetic, or any suitable storage technology that is operable with the system 100. For instance, in an example embodiment, the memory system 120 includes random access memory (RAM), read only memory (ROM), flash memory, a disk drive, a memory card, an optical storage device, a magnetic storage device, a memory module, any suitable type of memory device, or any number and combination thereof. With respect to the processing system 110 and/or other components of the system 100, the memory system 120 is local, remote, or a combination thereof (e.g., partly local and partly remote). For example, the memory system 120 can include at least a cloud-based storage system (e.g. cloud-based database system), which is remote from the processing system 110 and/or other components of the system 100.

The memory system 120 includes at least a patch defense system 130, a machine learning system 140, a computer vision application 150, and other relevant data 160, which are stored thereon. The patch defense system 130 includes computer readable data with instructions, which, when executed by the processing system 110, is configured to defend against patch attacks. The computer readable data can include instructions, code, routines, various related data, any software technology, or any number and combination thereof. In an example embodiment, the machine learning system 140 includes at least one artificial neural network model and/or any suitable machine learning model, which is configured to perform a computer vision task. In this regard, for example, the machine learning system 140 includes a classifier (e.g., a convolutional neural network (CNN), ResNet, vision transformer (ViT), any suitable classification model), an object detector, a semantic segmenter, any machine learning model that receives digital images as input data, or any number and combination thereof. Also, the computer vision application 150 is configured to apply the output of the machine learning system 140 to computer vision technology. Meanwhile, the other relevant data 160 provides various data (e.g. operating system, etc.), which enables the system 100 to perform the functions as discussed herein.

The system 100 is configured to include at least one sensor system 170. The sensor system 170 includes one or more sensors. For example, the sensor system 170 includes an image sensor, a camera, a radar sensor, a light detection and ranging (LIDAR) sensor, a thermal sensor, an ultrasonic sensor, an infrared sensor, a motion sensor, an audio sensor (e.g., microphone), any suitable sensor, or any number and combination thereof. The sensor system 170 is operable to communicate with one or more other components (e.g., processing system 110 and memory system 120) of the system 100. For example, the sensor system 170 may provide sensor data, which is then used by the processing system 110 to generate digital images based on the sensor data. In this regard, the processing system 110 is configured to obtain the sensor data as digital images directly or indirectly from one or more sensors of the sensor system 170. The sensor system 170 is local, remote, or a combination thereof (e.g., partly local and partly remote). Upon receiving the sensor data, the processing system 110 is configured to process this sensor data (e.g. digital images) in connection with the patch defense system 130, the machine learning system 140, the computer vision application 150, the other relevant data 160, or any number and combination thereof.

In addition, the system 100 may include at least one other component. For example, as shown in FIG. 1, the memory system 120 is also configured to store other relevant data 160, which relates to operation of the system 100 in relation to one or more components (e.g., sensor system 170, I/O devices 180, and other functional modules 190). In addition, the system 100 is configured to include one or more I/O devices 180 (e.g., display device, keyboard device, speaker device, etc.), which relate to the system 100. Also, the system 100 includes other functional modules 190, such as any appropriate hardware, software, or combination thereof that assist with or contribute to the functioning of the system 100. For example, the other functional modules 190 include communication technology (e.g. wired communication technology, wireless communication technology, or a combination thereof) that enables components of the system 100 to communicate with each other as described herein. In this regard, the system 100 is operable to performs digital image processing, as described herein, to transform an input image (e.g., a non-adversarial image or an adversarial image) into a clean image (i.e., a non-adversarial image) as a pre-processing strategy as a safeguard to the machine learning system 140 and ensure that the machine learning system 140 does not process digital images with adversarial patches therein.

Figure 2:
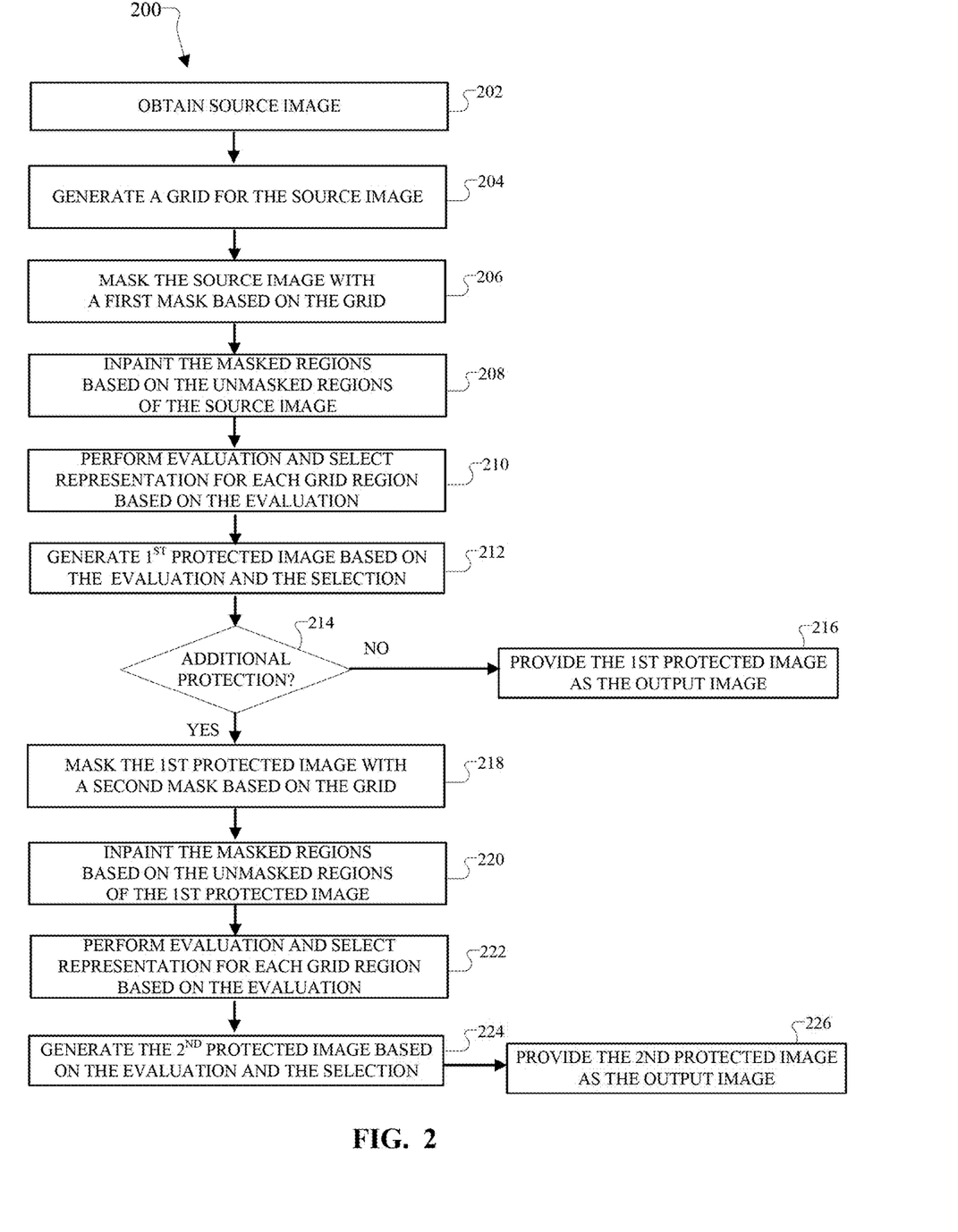
FIG. 2 is a flow diagram of an example of a process for defending against patch attacks according to an example embodiment of this disclosure.
Figure 3:
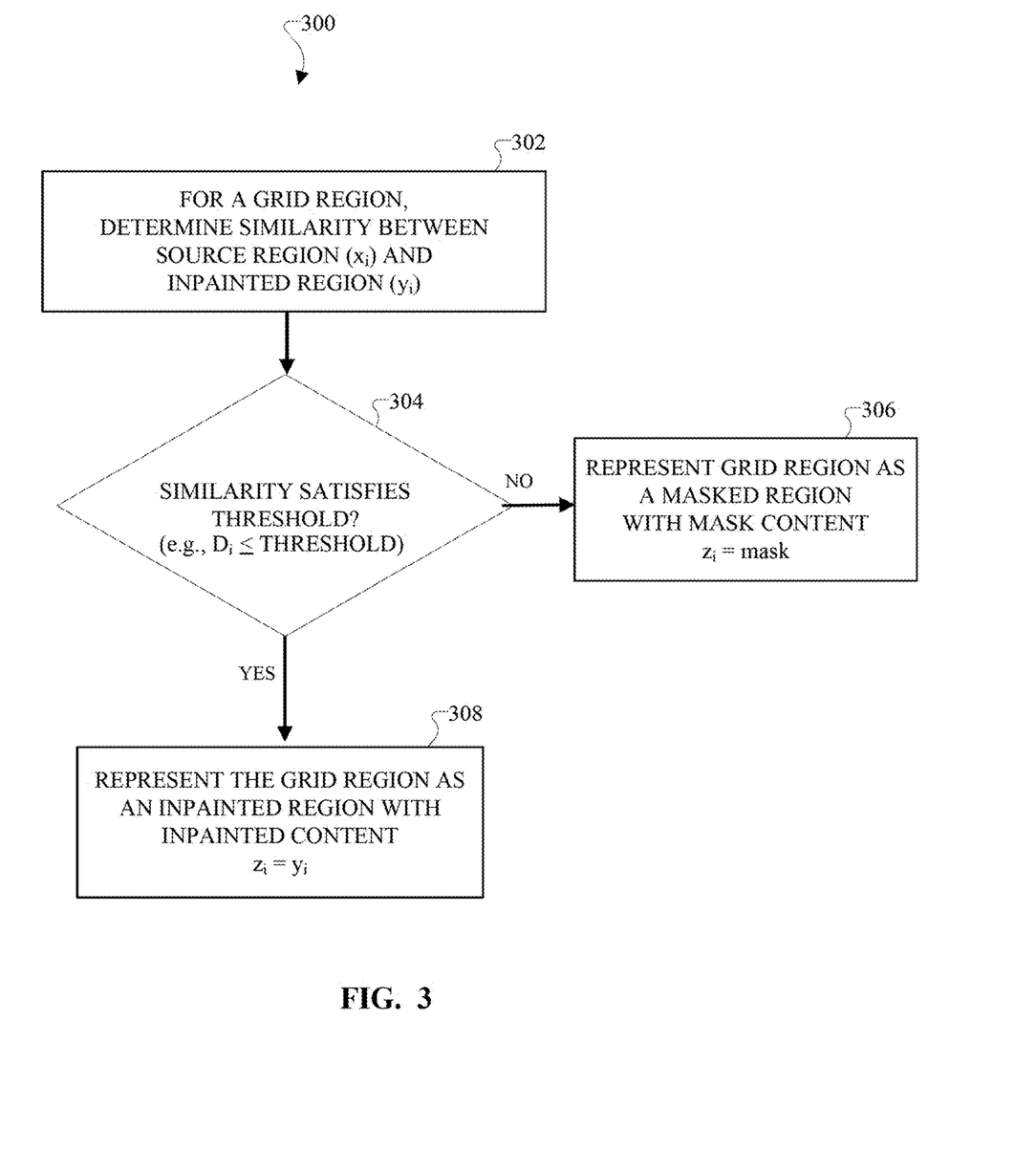
FIG. 3 is a flow diagram of an example an evaluation and selection process according to an example embodiment of this disclosure.
Figure 4:
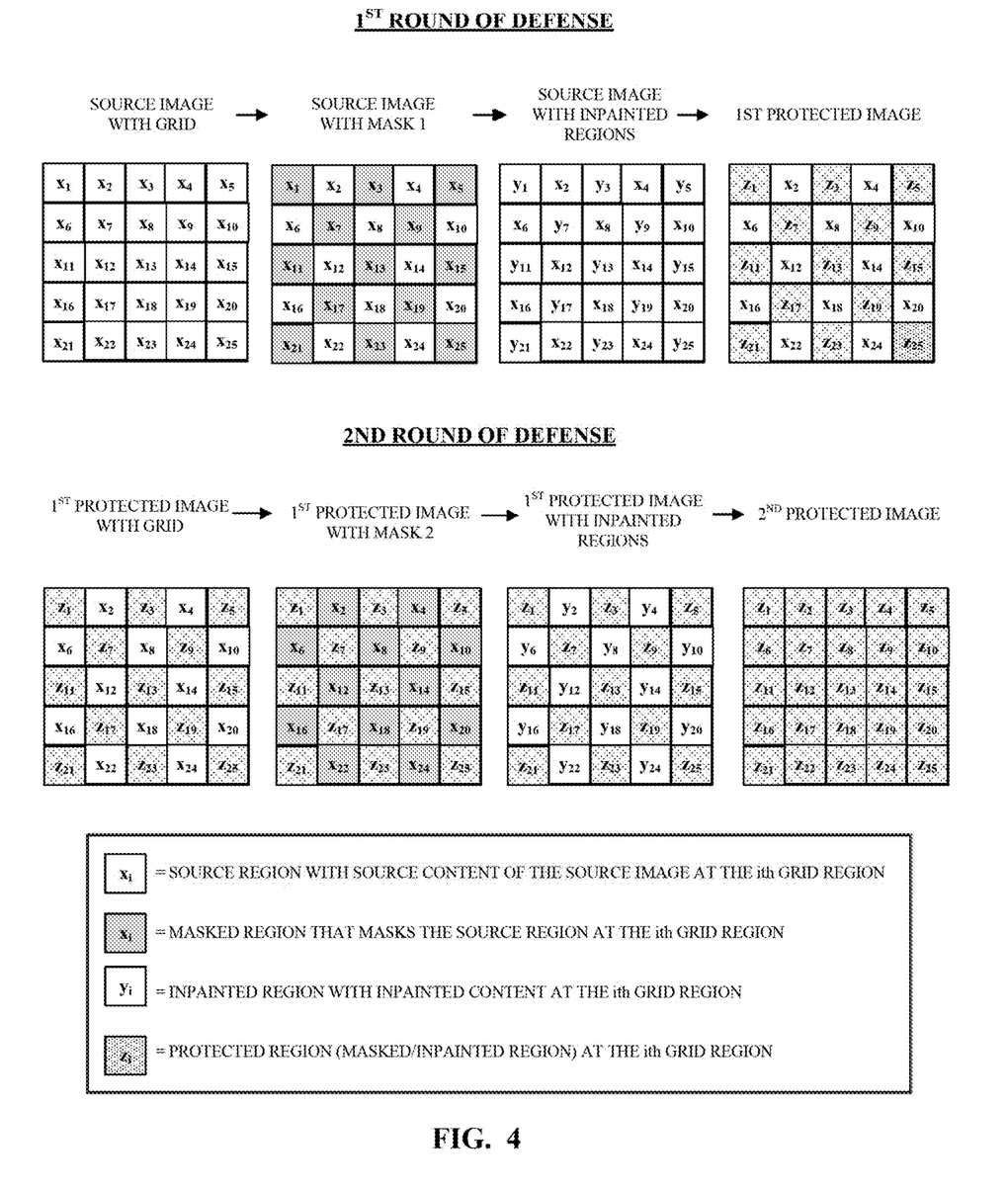
FIG. 4 is a conceptual diagram that illustrates non-limiting examples of various instances of the process of FIG. 2 according to an example embodiment of this disclosure.

FIG. 2, FIG. 3, and FIG. 4 illustrate various aspects of a process 200 for defending against patch attacks. More specifically, FIG. 2 is a flow diagram that illustrates steps of the process. FIG. 3 is a flow diagram that illustrate an example of the evaluation and selection process 300, which may be used in the process of FIG. 2. Also, FIG. 4 is a conceptual diagram that illustrate non-limiting examples of various instances of the process 200. The process 200 comprises a computer-implemented method, which is stored in the memory system 120 as the patch defense system 130 and which is executed via one or processors of the processing system 110. The process 200 may include more steps or less steps than those steps discussed with respect to FIG. 2 provided that such modifications provide the same functions and/or objectives as the process 200 of FIG. 2.

At step 202, according to an example, the processing system 110 obtains an input image, which may be referred to as the source image (denoted as "x"). The processing system 110 may obtain the source image directly or indirectly from the sensor system 170. The processing system 110 may obtain the source image from the memory system 120. For example, in FIG. 4, the source image is a digital image, which has a height (denoted as "h") and a width (denoted as "w"). The source image may be a digital image without any adversarial pixels (i.e., a "clean image"). Alternatively, the source image may be a digital image with an adversarial patch containing adversarial pixels. The adversarial patch may be defined with a height (denoted as "$h_p$") and a width (denoted as "$w_p$") such that $h > h_p$ and $w > w_p$.

At step 204, according to an example, the processing system 110 generates a grid for the source image. The processing system 110 divides the source image into N×N grid regions, where "N" represents an integer value that satisfies equation [1] and equation [2] below. As aforementioned, w represents the width of the source image, h represents the height of the source image, $h_p$ represents the height of the adversarial patch in the source image, and $w_p$ represents the width of the adversarial patch in the source image. Also, as an example, the processing system 110 may select a value of N, which is the largest integer value that enables at least four grid regions to correspond to a single adversarial patch. In addition, as a non-limiting and simplified example, FIG. 4 illustrates a grid in which N=5 such that the grid includes 5×5 grid regions (or 25 grid regions), which divide the source image into 5×5 source regions (or 25 source regions) that contain corresponding source content of the source image. Also, in FIG. 4, each source region and/or its corresponding source content is represented as $x_i$ (e.g., the first source region is $x_1$, the eighth source region is $x_8$, etc.).

$$\left[\frac{w}{N}\right] \geq \left[\frac{w_p}{2}\right] \quad [1]$$

$$\left[\frac{h}{N}\right] \geq \left[\frac{h_p}{2}\right] \quad [2]$$

At step 206, according to an example, the processing system 110 masks the source image with a first mask based on the grid. In this regard, for example, the processing system 110 applies the first mask to the source image. The first mask is configured to create a plurality of masked regions by masking a predetermined selection of grid regions of the source image such that the source content at each of those corresponding grid regions are masked (i.e., not exposed/visible or not available for processing). Also, when applied to the source image, the first mask creates a plurality of unmasked regions that comprise the source image such that corresponding source content for that corresponding grid region is exposed/visible, usable, and processed.

The first mask may be any suitable mask that provides a plurality of masked regions of the source image and creates a plurality of unmasked regions of the source image such that the unmasked regions comprise source regions that provide feature information for inpainting the masked regions. For example, in FIG. 4, the first mask is a checkerboard mask, which provides an alternating pattern of masked regions and unmasked regions across the plurality of grid regions. More specifically, as shown, the checkerboard mask is configured to provide a masked region at each odd-numbered grid region and create an unmasked grid region at each even-numbered grid region. For example, in FIG. 4, the first mask provides a plurality of masked regions, which include the following grid regions: first grid region, third grid region, fifth grid region, seventh grid region, ninth grid region, eleventh grid region, thirteenth grid region, fifteenth grid region, seventeenth grid region, nineteenth grid region, twenty-first grid region, twenty-third grid region, and twenty-fifth grid region. Also, in FIG. 4, the first mask creates a plurality of unmasked regions, which include the following grid regions: second grid region, fourth grid region, sixth grid region, eighth grid region, tenth grid region, twelfth grid region, fourteenth grid region, sixteenth grid region, eighteenth grid region, twentieth gird region, twenty-second grid region, and twenty-fourth grid region. As another example, the first mask may be a randomly generated mask, which masks a random selection of grid regions of the source image. Additionally or alternatively, the random selection of grid regions may be determined based on whether or not a randomly assigned probability value for a grid region is in a predetermined range.

At step 208, according to an example, the processing system 110 inpaints the plurality of masked regions of the source image. More specifically, for example, the processing system 110 is configured to inpaint each masked region by using information from source content (i.e., image content) of one or more source regions that are available (e.g., exposed from the first mask) via the unmasked regions. The processing system 110 is configured to use one or more machine learning models, which are trained to perform an inpainting task. As an example, for instance, the machine learning model is a diffusion-based inpainting model (e.g., Palette) or any suitable software/computer technology that performs inpainting.

Referring to FIG. 4, as an example, the processing system 110 inpaints each of the masked regions (masked $x_1$, masked $x_3$, masked $x_5$, masked $x_7$, masked $x_9$, masked $x_{11}$, masked $x_{13}$, masked $x_{15}$, masked $x_{17}$, masked $x_{19}$, masked $x_{21}$, masked $x_{23}$, and masked $x_{25}$) such that each of these corresponding grid regions become inpainted regions ($y_1$, $y_3$, $y_5$, $y_7$, $y_9$, $y_{11}$, $y_{13}$, $y_{15}$, $y_{17}$, $y_{19}$, $y_{21}$, $y_{23}$, and $y_{25}$), where $y_i$ represents a respective inpainted region. As shown in FIG. 4, this inpainted version of the source image comprises inpainted regions ($y_1$, $y_3$, $y_5$, $y_7$, $y_9$, $y_{11}$, $y_{13}$, $y_{15}$, $y_{17}$, $y_{19}$, $y_{21}$, $y_{23}$, and $y_{25}$) and source regions ($x_2$, $x_4$, $x_6$, $x_8$, $x_{10}$, $x_{12}$, $x_{14}$, $x_{16}$, $x_{18}$, $x_{20}$, $x_{22}$, and $x_{24}$) in an alternating pattern across the plurality of grid regions.

At step 210, according to an example, the processing system 110 performs an evaluation and selects a representation for each grid region based on the evaluation. More specifically, the evaluation includes a similarity assessment between each source region at a particular grid region and its corresponding inpainted region at that particular grid region. The similarity assessment is used to determine a similarity between a given source region and its corresponding inpainted region. For example, the similarity assessment is a mean square error calculation, an L2 distance calculation, or any suitable similarity calculation. The processing system 110 generates similarity data based on the similarity assessment. For example, the similarity data includes the result of the similarity assessment (e.g., the result of the mean square error calculation, the L2 distance, etc.). The similarity data may also include other data related to the similarity assessment and/or its result. The processing system 110 then uses the similarity data to determine a representation for each grid region, which was previously masked by the first mask at step 206. FIG. 3 also provides an example of this evaluation process.

In addition, the processing system 110 selects a representation for each grid region. More specifically, for a given grid region that was masked via the first mask at step 206, the processing system 110 selects a representation for that given grid region. The processing system 110 represents a given grid region as (i) the masked region upon determining that similarity data indicates the source region is not similar to the inpainted region for that given grid region and (ii) the inpainted region upon determining that the source region is similar to the inpainted region for that given grid region. This selection feature is advantageous in that the inpainted region is selected for the given grid region even when the similarity data indicates that there is sufficient similarity between a source region and its corresponding inpainted region as the inpainted region ensures that there are no adversarial pixels therein. In this regard, the processing system 110 accounts for a scenario in which there may be some adversarial pixels in the source region but an insufficient amount to generate a dissimilarity result for the similarity assessment. This selection feature is also advantageous in that a dissimilarity between a source region and its corresponding inpainted region may indicate the presence of adversarial pixels in that source region. In this case, upon determining dissimilarity, the processing system 110 is configured to select the masked region for that grid region to block that source region (and possible adversarial pixels) from consideration by a downstream machine learning system 140. In addition, FIG. 3 provides an example of this selection process.

Also, the processing system 110 determines that the source regions corresponding to the unmasked regions will remain as source regions. For example, in FIG. 4, the processing system 110 determines that the source regions ($x_2$, $x_4$, $x_6$, $x_8$, $x_{10}$, $x_{12}$, $x_{14}$, $x_{16}$, $x_{18}$, $x_{20}$, $x_{22}$, and $x_{24}$), which were unmasked regions of the first mask at step 206, will be selected to represent their corresponding grid regions. The processing system 110 did not perform inpainting for these grid regions at step 208 and also did not perform a similarity assessment on these grid regions at step 210, and thus keeps these grid regions as source regions.

At step 212, according to an example, the processing system 110 generates a first protected image based on the evaluation and selection at step 210. The first protected image includes (i) source regions and inpainted regions, or (ii) source regions along with one or more inpainted regions and one or more masked regions. That is, the first protected image is a combination of source regions and protected regions (e.g., inpainted regions, masked regions, or a combination thereof), where each protected region is represented as $z_i$. Each protected region defends against adversarial pixels. In this regard, if a protected region is selected to be the masked region, then the mask blocks the adversarial pixels. Alternatively, if the protected region is selected to be the inpainted regions, then the inpainting is generated by an inpainting model, which is trained on non-adversarial digital images and on the same data distribution as the downstream machine learning system 140 such that the inpainting only generates non-adversarial pixels or clean pixels.

At step 214, according to an example, the processing system 110 is configured to determine whether or not additional protection is requested for the protected image. If there are no requests and/or instructions for additional protection, then the processing system 110 performs step 216. Alternatively, if there is a request and/or instructions for additional protection, then the processing system 110 performs step 218.

At step 216, according to an example, the processing system 110 provides the first protected image as the output image of the patch defense system 130. The first protected image is generated to ensure that at least a predetermined set of grid regions contain non-adversarial pixels via (i) inpainted regions, (ii) masked regions, or (iii) a combination of inpainted regions and masked regions. The first protected image is considered to be agnostic to downstream machine learning systems 140, which perform tasks on digital images. In this regard, the processing system 110 is configured to feed or transmit the output image of the patch defense system 130 as input data to the pre-trained machine learning system 140.

At step 218, according to an example, the processing system 110 masks the first protected image with a second mask based on the grid. In this regard, for example, the processing system 110 applies the second mask to the first protected image. The processing system 110 may use the same grid established at step 204 when applying the second mask. The second mask is configured to create a plurality of masked regions by masking a selection of predetermined grid regions of the source image such that the source content at that selection of predetermined grid regions are masked (i.e., not exposed/visible or not available for use). In addition, the second mask is configured to create a plurality of unmasked regions that comprise the first protected image such that corresponding protected content (e.g., inpainted content or mask content) for that corresponding grid region is exposed, visible, and usable.

In this example, the second mask is a negation of the first mask. More specifically, the second mask is configured to create (i) masked regions of the second mask that now mask the unmasked regions of the first mask and (ii) unmasked regions of the second mask that now comprise the source regions of the source image. Referring to FIG. 4, as an example, the second mask is checkerboard mask, which provides an alternating pattern of unmasked regions and masked regions across the plurality of grid regions. More specifically, as shown in FIG. 4, the checkerboard mask is configured to create an unmasked region at each odd-numbered grid region and provide a masked region at each even-numbered grid region. For example, in FIG. 4, the second mask provides a plurality of unmasked regions, which include the following grid regions: first grid region, third grid region, fifth grid region, seventh grid region, ninth grid region, eleventh grid region, thirteenth grid region, fifteenth grid region, seventeenth grid region, nineteenth grid region, twenty-first grid region, twenty-third grid region, and twenty-fifth grid region. Also, in FIG. 4, the first mask creates a plurality of masked regions, which include the following grid regions: second grid region, fourth grid region, sixth grid region, eighth grid region, tenth grid region, twelfth grid region, fourteenth grid region, sixteenth grid region, eighteenth grid region, twentieth gird region, twenty-second grid region, and twenty-fourth grid region. As another example, the second mask may be a negation of the randomly generated first mask.

At step 220, according to an example, the processing system 110 inpaints the masked regions based on the unmasked regions of the first protected image. More specifically, for example, the processing system 110 is configured to inpaint each masked region by using information from one or more protected regions that are available (e.g., exposed from the first mask) via the unmasked regions. The processing system 110 and the patch defense system 130 may use one or more machine learning models, which are trained to perform an inpainting task. For example, the patch defense system 130 may include a diffusion-based inpainting model (e.g., Palette) or any suitable inpainting technology. In this example, the same inpainter that was used at step 208 is also used at step 220.

Referring to FIG. 4, as an example, the processing system 110 inpaints each of the masked regions (masked $x_2$, masked $x_4$, masked $x_6$, masked $x_8$, masked $x_{10}$, masked $x_{12}$, masked $x_{14}$, masked $x_{15}$, masked $x_{18}$, masked $x_{20}$, masked $x_{22}$, and masked $x_{24}$) such that each of these corresponding grid regions become inpainted regions ($y_2$, $y_4$, $y_6$, $y_8$, $y_{10}$, $y_{12}$, $y_{14}$, $y_{16}$, $y_{18}$, $y_{20}$, $y_{22}$, and $y_{24}$), where $x_i$ represents a respective source region and $y_i$ represents a respective inpainted region. As shown in FIG. 4, this inpainted version of the first protected image includes protected regions ($z_1$, $z_3$, $z_5$, $z_7$, $z_9$, $z_{11}$, $z_{13}$, $z_{15}$, $z_{17}$, $z_{19}$, $z_{21}$, $z_{23}$, and $z_{25}$) and inpainted regions ($y_2$, $y_4$, $y_6$, $y_8$, $y_{10}$, $y_{12}$, $y_{14}$, $y_{16}$, $y_{18}$, $y_{20}$, $y_{22}$, and $y_{24}$).

At step 222, according to an example, the processing system 110 performs an evaluation and selects a representation for each grid region based on the evaluation. More specifically, the evaluation includes a similarity assessment between each source region at a particular grid region and its corresponding inpainted region at that particular grid region. The similarity assessment is used to determine a similarity between a given source region and its corresponding inpainted region. For example, the similarity assessment is a mean square error calculation, an L2 distance calculation, or any suitable similarity calculation. The processing system 110 generates similarity data based on the similarity assessment. For example, the similarity data includes the result of the similarity assessment (e.g., the result of the mean square error calculation, the L2 distance, etc.). The similarity data may also include other data related to the similarity assessment and/or its result. The processing system 110 then uses the similarity data to determine a representation for each grid region, which was previously masked by the second mask at step 218. FIG. 3 also provides an example of this evaluation process.

In addition, the processing system 110 selects a representation for each grid region. More specifically, for a given grid region that was masked via the second mask at step 218, the processing system 110 selects a representation for that given grid region. The processing system 110 represents a given grid region as (i) the masked region upon determining that similarity data indicates the source region is not similar to the inpainted region for that given grid region and (ii) the inpainted region upon determining that the source region is similar to the inpainted region for that given grid region. This selection feature is advantageous in that the inpainted region is selected for the given grid region even when the similarity data indicates that there is sufficient similarity between a source region and its corresponding inpainted region as the inpainted region ensures that there are no adversarial pixels therein. In this regard, the processing system 110 accounts for a scenario in which there may be some adversarial pixels in the source region but an insufficient amount to generate a dissimilarity result for the similarity assessment. This selection feature is also advantageous in that a dissimilarity between a source region and its corresponding inpainted region may indicate the presence of adversarial pixels in that source region. In this case, upon determining dissimilarity, the processing system 110 is configured to select the masked region for that grid region to block that source region (and possible adversarial pixels) from consideration by a downstream machine learning system 140. In addition, FIG. 3 provides an example of this selection process.

Also, the processing system 110 determines that the protected regions corresponding to the unmasked regions will remain as protected regions. For example, in FIG. 4, the processing system 110 determines that the protected regions ($z_1$, $z_3$, $z_5$, $z_7$, $z_9$, $z_{11}$, $z_{13}$, $z_{15}$, $z_{17}$, $z_{19}$, $z_{21}$, $z_{23}$, and $z_{25}$), which were unmasked regions of the second mask at step 218 will be selected to represent their corresponding grid regions. Since the processing system 110 already determined and selected the representation for these grid regions, the processing system 110 keeps these regions as protected regions.

At step 224, according to an example, the processing system 110 generates a second protected image based on the evaluation and selection at step 222. The second protected image includes only protected regions ($z_1$, $z_2$, $z_3$, $z_4$, $z_5$, $z_6$, $z_7$, $z_8$, $z_9$, $z_{10}$, $z_{11}$, $z_{12}$, $z_{13}$, $z_{14}$, $z_{15}$, $z_{16}$, $z_{17}$, $z_{18}$, $z_{19}$, $z_{20}$, $z_{21}$, $z_{22}$, $z_{23}$, $z_{24}$ and $z_{25}$). As discussed above, each protected region is selected to be either an inpainted region or a masked region. The second protected image is advantageous in that the second protected image does not contain any source regions, which may or may not contain adversarial pixels.

At step 226, according to an example, the processing system 110 provides the second protected image as the output image of the patch defense system 130. The second protected image is generated to ensure that at least each grid region contains non-adversarial pixels. In this regard, as shown in FIG. 4, the second protected image contains only non-adversarial pixels via inpainted regions, masked regions, or a combination of inpainted regions and masked regions. The second protected image does not contain any source regions, which may or may not contain adversarial pixels. The second protected image is considered to be agnostic to pre-trained machine learning systems 140, which perform tasks on digital images. In this regard, the processing system 110 is configured to feed the output image of the patch defense system 130 as input data to the pre-trained machine learning system 140.

FIG. 3 is a flow diagram that illustrate an example of the evaluation and selection process 300 according to an example embodiment. The process 300 comprises a computer-implemented method, which is stored in the memory system 120 as the patch defense system 130 and which is executed via one or processors of the processing system 110. The process 300 may include more steps or less steps than those steps discussed with respect to FIG. 3 provided that such modifications provide the same functions and/or objectives as the method of FIG. 3. For convenience of illustration and explanation, FIG. 3 illustrates the evaluation and selection process 300 with respect to a given grid region. However, this evaluation and selection process 300 is performed independently or simultaneously for at least each of the grid regions, which are inpainted at step 208 and step 220, respectively.

At step 302, according to an example, the processing system 110 is configured to determine a similarity between source content of a source region (e.g., $x_i$) and inpainted content of an inpainted region (e.g., $y_i$) for a given grid region (e.g., ith grid region). In this regard, the processing system 110 is configured to generate similarity data based on a similarity assessment between the source region, which contains corresponding source content, and the inpainted region, which contains corresponding inpainted content. For example, in FIG. 3, the similarity assessment includes an L2 distance calculation (e.g., $D_i(x_i, y_i)$), which is used to generate the similarity data.

Referring to FIG. 4, as an example, the processing system 110 generates similarity data based on a similarity assessment between source content and inpainted content for $x_1$ and $y_1$ of the first grid region, $x_3$ and $y_3$ of the third grid region, $x_5$ and $y_5$ of the fifth grid region, $x_7$ and $y_7$ of the seventh grid region, $x_9$ and $y_9$ of the ninth grid region, $x_{11}$ and $y_{11}$ of the eleventh grid region, $x_{13}$ and $y_{13}$ of the thirteenth grid region, $x_{15}$ and $y_{15}$ of the fifteenth grid region, $x_{17}$ and $y_{17}$ of the seventeenth grid region, $x_{19}$ and $y_{19}$ of the nineteenth grid region, $x_{21}$ and $y_{21}$ of the twenty-first grid region, $x_{23}$ and $y_{23}$ of the twenty-third grid region, and $x_{25}$ and $y_{25}$ of the twenty-fifth grid region during step 210. As another example, in FIG. 4, the processing system 110 generates similarity data between source content and inpainted content for $x_2$ and $y_2$ of the second grid region, $x_4$ and $y_4$ of the fourth grid region, $x_6$ and $y_6$ of the sixth grid region, $x_8$ and $y_8$ of the eighth grid region, $x_{10}$ and $y_{10}$ of the tenth grid region, $x_{12}$ and $y_{12}$ of the twelfth grid region, $x_{14}$ and $y_{14}$ of the fourteenth grid region, $x_{16}$ and $y_{16}$ of the sixteenth grid region, $x_{18}$ and $y_{18}$ of the eighteenth grid region, $x_{20}$ and $y_{20}$ of the twentieth grid region, $x_{22}$ and $y_{22}$ of the twenty-seconth grid region, and $x_{24}$ and $y_{24}$ of the twenty-fourth grid region during step 222.

At step 304, according to an example, the processing system 110 is configured to evaluate the similarity data to determine if the source region (e.g., source content) and the corresponding inpainted region (e.g., inpainted content) of a given grid region are considered sufficiently similar or sufficiently dissimilar with respect to a threshold. For example, the processing system 110 is configured to determine that the source region of a given grid region is similar to the inpainted region of that given grid region when the similarity data is less than or equal to a threshold value, as indicated in equation 3. Alternatively, the processing system 110 is configured to determine that the source region of a given grid region is dissimilar (or not sufficiently similar) to the inpainted region of that given grid region when the similarity data is greater than the threshold value, as indicated in equation 4.

$$\text{SIMILAR}: D_i(x_i, y_i) \leq \text{Threshold} \tag{3}$$

$$\text{DISSIMILAR}: D_i(x_i, y_i) > \text{Threshold} \tag{4}$$

At step 306, according to an example, the processing system 110 is configured to select the masked region to represent the grid region when the similarity data is greater than the threshold value. In this regard, the masked region is selected to replace the source region at the grid region as the source region may include adversarial pixels. The masked region thus serves as a protected region as the masked region contains mask content, which does not contain adversarial pixels.

At step 308, according to an example, the processing system 110 is configured to select the inpainted region to represent the grid region when the similarity data is less than or equal to the threshold value. In this regard, the inpainted region is selected to replace the source region at the grid region as there is a possibility that the source region may include adversarial pixels of an insufficient number that does not cause the similarity data to be considered dissimilar with respect to the threshold. The inpainted region thus serves as a protected region as the inpainted region does not contain adversarial pixels since the inpainting model is not trained to generate adversarial pixels.

Figure 5:
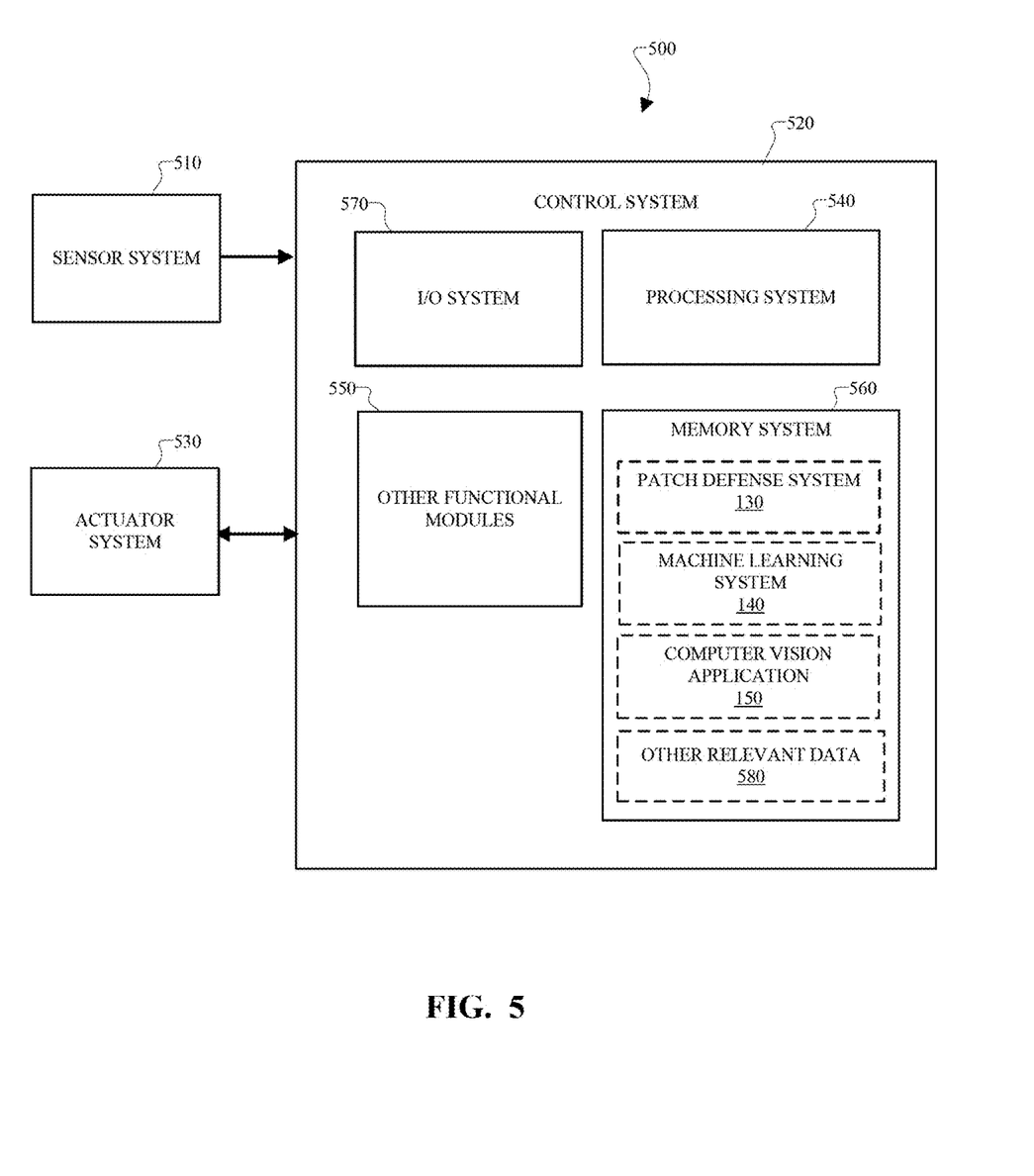
FIG. 5 is a diagram of an example of a control system that includes the patch defense system according to an example embodiment of this disclosure.

FIG. 5 is a diagram of a system 500, which includes the patch defense system 130. The system 500 is configured to also include at least a sensor system 510, a control system 520, and an actuator system 530. The system 500 is configured such that the control system 520 controls the actuator system 530 based on sensor data from the sensor system 510. More specifically, the sensor system 510 includes one or more sensors and/or corresponding devices to generate sensor data. For example, the sensor system 510 includes an image sensor, a camera, a radar sensor, a light detection and ranging (LIDAR) sensor, a thermal sensor, an ultrasonic sensor, an infrared sensor, a motion sensor, a satellite-based navigation sensor (e.g., Global Positioning System (GPS) sensor), an optical sensor, an audio sensor, any suitable sensor, or any number and combination thereof. Upon obtaining detections from the environment, the sensor system 510 is operable to communicate with the control system 520 via an input/output (I/O) system 570 and/or other functional modules 550, which includes communication technology.

The control system 520 is configured to obtain the sensor data directly or indirectly from one or more sensors of the sensor system 510. In this regard, the sensor data may include sensor data from a single sensor or sensor-fusion data from a plurality of sensors. Upon receiving input, which includes at least sensor data, the control system 520 is operable to process the sensor data via the processing system 540. In this regard, the processing system 540 includes at least one processor. For example, the processing system 540 includes an electronic processor, a central processing unit (CPU), a graphics processing unit (GPU), a microprocessor, a field-programmable gate array (FPGA), an application-specific integrated circuit (ASIC), processing circuits, any suitable processing technology, or any combination thereof. Upon processing at least this sensor data, the processing system 540 is configured to extract, generate, and/or obtain proper input data (e.g., digital image data) for the patch defense system 130. In addition, the processing system 540 is operable to generate output data (e.g., first protected images and/or second protected images) via the patch defense system 130 based on communications with the memory system 560. In addition, the processing system 540 is operable to provide actuator control data to the actuator system 530 based on the output data and/or the first or second protected images.

The memory system 560 is a computer or electronic storage system, which is configured to store and provide access to various data to enable at least the operations and functionality, as disclosed herein. The memory system 560 comprises a single device or a plurality of devices. The memory system 560 includes electrical, electronic, magnetic, optical, semiconductor, electromagnetic, any suitable memory technology, or any combination thereof. For instance, the memory system 560 may include random access memory (RAM), read only memory (ROM), flash memory, a disk drive, a memory card, an optical storage device, a magnetic storage device, a memory module, any suitable type of memory device, or any number and combination thereof. In an example embodiment, with respect to the control system 520 and/or processing system 540, the memory system 560 is local, remote, or a combination thereof (e.g., partly local and partly remote). For example, the memory system 560 may include at least a cloud-based storage system (e.g. cloud-based database system), which is remote from the processing system 540 and/or other components of the control system 520.

The memory system 560 includes at least the patch defense system 130, which is executed via the processing system 540. The patch defense system 130 is configured to receive or obtain input data, which includes a digital image. In this regard, the patch defense system 130, via the processing system 540, is configured to generate output data (e.g., a first protected image or a second protected image) based on the input data (e.g., source image).

Furthermore, as shown in FIG. 5, the system 500 includes other components that contribute to operation of the control system 520 in relation to the sensor system 510 and the actuator system 530. For example, as shown in FIG. 5, the memory system 560 is also configured to store other relevant data 580, which relates to the operation of the system 500 in relation to one or more components (e.g., sensor system 510, the actuator system 530, etc.). Also, as shown in FIG. 5, the control system 520 includes the I/O system 570, which includes one or more interfaces for one or more I/O devices that relate to the system 500. For example, the I/O system 570 provides at least one interface to the sensor system 510 and at least one interface to the actuator system 530. Also, the control system 520 is configured to provide other functional modules 550, such as any appropriate hardware technology, software technology, or any combination thereof that assist with and/or contribute to the functioning of the system 500. For example, the other functional modules 550 include an operating system and communication technology that enables components of the system 500 to communicate with each other as described herein. With at least the configuration discussed in the example of FIG. 5, the system 500 is applicable in various technologies.

Figure 6:
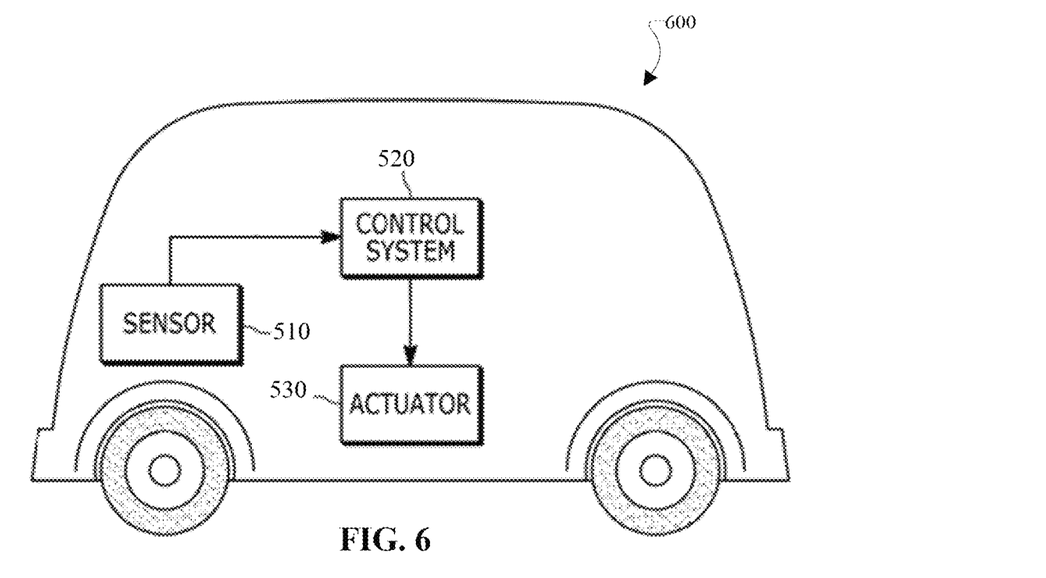
FIG. 6 is a diagram of the control system of FIG. 5 with respect to mobile machine technology according to an example embodiment of this disclosure.

FIG. 6 is a diagram of the system 500 with respect to mobile machine technology 600 according to an example embodiment. As a non-limiting example, the mobile machine technology 600 includes at least a partially autonomous vehicle or robot. In FIG. 6, the mobile machine technology 600 is at least a partially autonomous vehicle, which includes a sensor system 510. The sensor system 510 includes an optical sensor, an image sensor, a video sensor, an ultrasonic sensor, a position sensor (e.g. GPS sensor), a radar sensor, a LIDAR sensor, any suitable sensor, or any number and combination thereof. One or more of the sensors may be integrated with respect to the vehicle. The sensor system 510 is configured to provide sensor data to the control system 520.

The control system 520 is configured to obtain image data, which is based on sensor data or sensor-fusion data from the sensor system 510. In addition, the control system 520 is configured to pre-process the sensor data to provide input data of a suitable form (e.g., digital image data) to the patch defense system 130. In this regard, the patch defense system 130 is advantageously configured to provide protected images to the machine learning system 140. In this regard, the patch defense system 130 is advantageously configured to defend against adversarial patch attacks by providing first/second protected images that do not contain adversarial pixels.

Upon receiving the first/second protected images from the patch defense system 130, the control system 520 is enabled to ensure that the machine learning system 140 receives these first/second protected images (i.e., non-adversarial input data). In addition, the control system 520 is configured to generate actuator control data, which is based at least on output data of the machine learning system 140 in accordance with the computer vision application 150. By providing first/second protected images to the machine learning system 140, the control system 520 is configured to generate actuator control data that allows for safer and more accurate control of the actuator system 530 of the vehicle by at least partially or fully removing any adversarial pixels from the input images (or the source images). The actuator system 530 may include a braking system, a propulsion system, an engine, a drivetrain, a steering system, or any number and combination of actuators of the vehicle. The actuator system 530 is configured to control the vehicle so that the vehicle follows rules of the roads and avoids collisions based at least on the output data that is generated by the machine learning system 140 in response to the first/second protected images.

Figure 7:
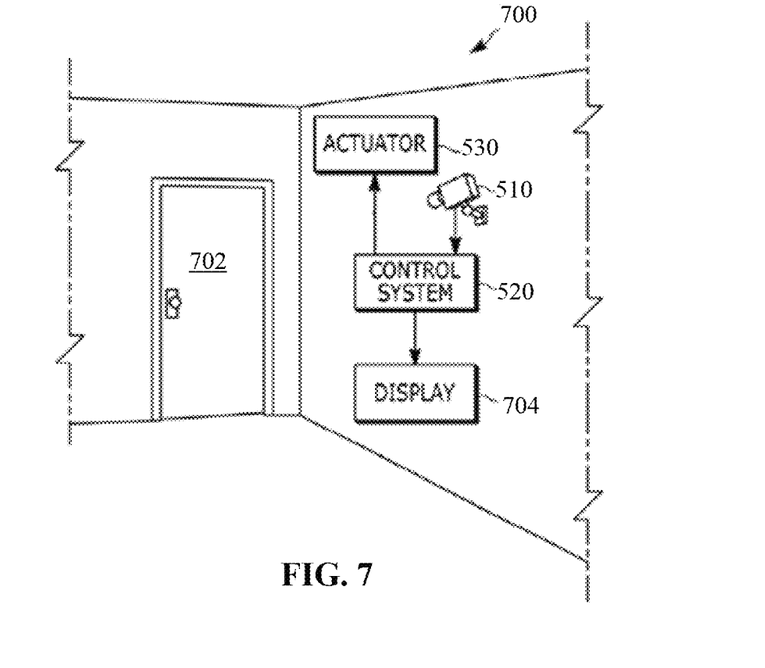
FIG. 7 is a diagram of the control system of FIG. 5 with respect to security technology according to an example embodiment of this disclosure.

FIG. 7 is a diagram of the system 500 with respect to security technology 700 according to an example embodiment. As a non-limiting example, the security technology 700 includes at least a monitoring system, a control access system, a surveillance system, or any suitable type of security apparatus. For instance, as one example, FIG. 7 relates to security technology 700, which is configured to physically control a locked state and an unlocked state of a lock of the door 702 and display an enhanced image/video on the display 704. The sensor system 510 includes at least an image sensor that is configured to provide image/video data.

The control system 520 is configured to obtain the image/video data from the sensor system 510. The control system 520 is also configured generate first/second protected images via the patch defense system 130 based on the image/video data obtained from the sensor system 510. In this regard, the patch defense system 130 is configured to provide clean and protected images to the machine learning system 140. In addition, the control system 520 is configured to generate actuator control data that allows for safer and more accurate control of the actuator system 530 by using output data, which is generated by the machine learning system 140 and which is based on first/second protected images. The control system 520 is configured to display the first/second protected images, the output data of the machine learning system 140, or any data relating to the computer vision application 150, or any number and combination thereof on the display 704.

Figure 8:
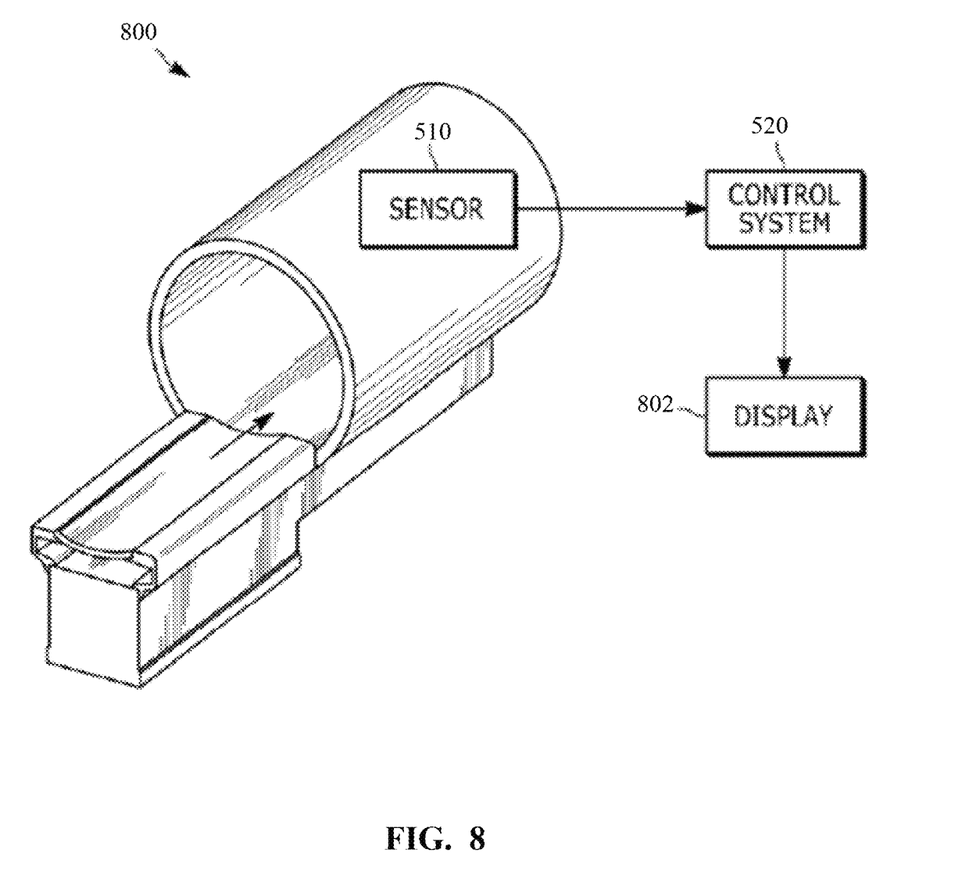
FIG. 8 is a diagram of the control system of FIG. 5 with respect to imaging technology according to an example embodiment of this disclosure.

FIG. 8 is a diagram of the system 500 with respect to imaging technology 800 according to an example embodiment. As a non-limiting example, the imaging technology 800 includes a magnetic resonance imaging (MRI) apparatus, an x-ray imaging apparatus, an ultrasonic apparatus, a medical imaging apparatus, or any suitable type of imaging apparatus. In FIG. 8, the sensor system 510 includes at least one imaging sensor. The control system 520 is configured to obtain image data from the sensor system 510. The control system 520 is also configured to generate first/second protected images via the patch defense system 130 based on the original image/video data. In addition, the control system 520 is configured to provide more accurate medical information by using the first/second protected images as input to the machine learning system 140 than by using the original image/video data, which may include adversarial pixels and/or adversarial patches. In addition, the control system 520 is configured to display the any relevant data (e.g., first/second protected image, output data of the machine learning system 140, relevant data from the computer vision application 150, or any number and combination thereof) on the display 802.

As described in this disclosure, the system 100 provides several advantages and benefits. For example, the system 100 is configured to defend against patch attacks by generating protected versions (e.g., first protected image or second protected image) of the input image. The system 100 is configured to generate protected regions (e.g., inpainted/masked regions) within the protected images to ensure that these grid regions include non-adversarial pixels. The system 100 is advantageous in providing an inpainter (i.e., one or more machine learning models trained for inpainting), which is trained with the same data distribution as the downstream machine learning system 140. As an advantage, the inpainter will only fill in the masked regions with image content that follows its data distribution during training. In addition, the system 100 is advantageous in providing the patch defense system 130 as a pre-processing strategy for downstream machine learning systems 140. Also, the system 100 generates digital images (e.g., first protected image or second protected image), which are agnostic to downstream machine learning systems 140. For example, the first/second protected image may serve as input to a machine learning system 140, which includes a classifier, an object detector, a semantic segmenter, any suitable image-based machine learning model, or any number and combination thereof. Furthermore, unlike other adversarial patch defenses, the system 100 makes no assumptions on the pattern of the adversarial patch and does not require creating adversarial patches to train a patch detector.

That is, the above description is intended to be illustrative, and not restrictive, and provided in the context of a particular application and its requirements. Those skilled in the art can appreciate from the foregoing description that the present invention may be implemented in a variety of forms, and that the various embodiments may be implemented alone or in combination. Therefore, while the embodiments of the present invention have been described in connection with particular examples thereof, the general principles defined herein may be applied to other embodiments and applications without departing from the spirit and scope of the described embodiments, and the true scope of the embodiments and/or methods of the present invention are not limited to the embodiments shown and described, since various modifications will become apparent to the skilled practitioner upon a study of the drawings, specification, and following claims. Additionally or alternatively, components and functionality may be separated or combined differently than in the manner of the various described embodiments, and may be described using different terminology. These and other variations, modifications, additions, and improvements may fall within the scope of the disclosure as defined in the claims that follow.

What is claimed is:

1. A computer-implemented method for defending against adversarial patch attacks, the method comprising:
   obtaining a source image;
   dividing the source image into a plurality of source regions using a grid with a plurality of grid regions, the plurality of source regions being portions of the source image that correspond to the plurality of grid regions;
   generating, via a first mask, a first masked region that masks a first source region and a first unmasked region that corresponds to a second source region;
   generating a first inpainted region by inpainting the first masked region based at least on the second source region;
   generating first similarity data indicative of a similarity assessment between the first source region and the first inpainted region; and
   generating a protected image, the protected image being a digital image that includes at least a protected region for a first grid region, the protected region being (i) the first masked region at the first grid region when the first similarity data evaluated with respect to a threshold indicates that the first source region is not similar to the first inpainted region and (ii) the first inpainted region at the first grid region when the first similarity data evaluated with respect to the threshold indicates that the first source region is similar to the first inpainted region.

2. The computer-implemented method of claim 1, wherein:
   the first mask includes a plurality of masked regions and a plurality of unmasked regions;
   the plurality of masked regions include the first masked region;
   the plurality of unmasked regions include the first unmasked region; and
   the first mask is configured to mask the source image across the plurality of grid regions in an alternating pattern involving the plurality of masked regions and the plurality of unmasked regions.

3. The computer-implemented method of claim 1, further comprising:
   generating, via a second mask, a second masked region that masks the second source region of the protected image and a second unmasked portion that comprises the first grid region;
   generating second inpainted region by inpainting the second masked region based on the first grid region;
   generating second similarity data indicative of the similarity assessment between the second source region and the second inpainted region; and
   generating another protected image that includes at least (i) the second masked region at a second grid region in response to the second similarity data indicating that the second source region is not similar to the second inpainted region and (ii) the second inpainted region at the second grid region in response to the second similarity data indicating that the second source region is similar to the second inpainted region.

4. The computer-implemented method of claim 1, wherein:
the first mask is configured to mask the source image at a selection of the plurality of grid regions; and
the selection is determined based on a probability value in relation to another threshold, the probability value being randomly assigned to each grid region.

5. The computer-implemented method of claim 1, wherein:
the similarity assessment includes an L2 distance calculation between first source content of the first source region and first impainted content of the first inpainted region;
the first similarity data includes a distance that is computed based on the L2 distance calculation; and
the protected image includes (i) the first masked region at the first grid region when the distance is greater than the threshold and (ii) the first inpainted region at the first grid region when the distance is equal to or less than the threshold.

6. The computer-implemented method of claim 1, wherein the similarity assessment includes a mean squared error that is computed with respect to first source content of the first source region and first impainted content of the first inpainted region.

7. The computer-implemented method of claim 1, wherein the step of dividing the source image into a plurality of source regions further comprises:
defining a putative adversarial patch in the source image; and
defining the grid such that the putative adversarial patch comprises at least four grid regions.

8. A system comprising:
a processor; and
a memory in data communication with the processor, the memory having computer readable data including instructions stored thereon that, when executed by the processor, cause the processor to perform a method for defending against adversarial patch attacks, the method including:
obtaining a source image;
dividing the source image into a plurality of source regions using a grid with a plurality of grid regions, the plurality of source regions being portions of the source image that correspond to the plurality of grid regions;
generating, via a first mask, a first masked region that masks a first source region and a first unmasked region that corresponds to a second source region;
generating a first inpainted region by inpainting the first masked region based at least on the second source region;
generating first similarity data indicative of a similarity assessment between the first source region and the first inpainted region; and
generating a protected image, the protected image being a digital image that includes at least a protected region for a first grid region, the protected region being (i) the first masked region at the first grid region when the first similarity data evaluated with respect to a threshold indicates that the first source region is not similar to the first inpainted region and (ii) the first inpainted region at the first grid region when the first similarity data evaluated with respect to the threshold indicates that the first source region is similar to the first inpainted region.

9. The system of claim 8, wherein:
the first mask includes a plurality of masked regions and a plurality of unmasked regions;
the plurality of masked regions include the first masked region;
the plurality of unmasked regions include the first unmasked region; and
the first mask is configured to mask the source image across the plurality of grid regions in an alternating pattern involving the plurality of masked regions and the plurality of unmasked regions.

10. The system of claim 8, further comprising:
generating, via a second mask, a second masked region that masks the second source region of the protected image and a second unmasked portion that comprises the first grid region;
generating second inpainted region by inpainting the second masked region based on the first grid region;
generating second similarity data indicative of the similarity assessment between the second source region and the second inpainted region; and
generating another protected image that includes at least (i) the second masked region at a second grid region in response to the second similarity data indicating that the second source region is not similar to the second inpainted region and (ii) the second inpainted region at the second grid region in response to the second similarity data indicating that the second source region is similar to the second inpainted region.

11. The system of claim 8, wherein:
the first mask is configured to mask the source image at a selection of the plurality of grid regions; and
the selection is determined based on a probability value in relation to another threshold, the probability value being randomly assigned to each grid region.

12. The system of claim 8, wherein:
the similarity assessment includes an L2 distance calculation between first source content of the first source region and first impainted content of the first inpainted region;
the first similarity data includes a distance that is computed based on the L2 distance calculation; and
the protected image includes (i) the first masked region at the first grid region when the distance is greater than the threshold and (ii) the first inpainted region at the first grid region when the distance is equal to or less than the threshold.

13. The system of claim 8, wherein the similarity assessment includes a mean squared error that is computed with respect to first source content of the first source region and first impainted content of the first inpainted region.

14. The system of claim 8, wherein the step of dividing the source image into a plurality of source regions further comprises:
defining a putative adversarial patch in the source image; and
defining the grid such that the putative adversarial patch comprises at least four grid regions.

15. A non-transitory computer readable medium having computer readable data including instructions stored thereon that, when executed by a processor, cause the processor to perform a method for defending against patch attacks, the method including:

dividing a source image into a plurality of source regions using a grid with a plurality of grid regions, the plurality of source regions being portions of the source image that correspond to the plurality of grid regions;

generating, via a first mask, a first masked region that masks a first source region and a first unmasked region that corresponds to a second source region;

generating a first inpainted region by inpainting the first masked region based at least on the second source region;

generating first similarity data indicative of a similarity assessment between the first source region and the first inpainted region; and generating a protected image, the protected image being a digital image that includes at least a protected region for a first grid region, the protected region being (1) the first masked region at the first grid region when the first similarity data evaluated with respect to a threshold indicates that the first source region is not similar to the first inpainted region and (ii) the first inpainted region at the first grid region when the first similarity data evaluated with respect to the threshold indicates that the first source region is similar to the first inpainted region.

16. The non-transitory computer readable medium of claim 15, wherein:
the first mask includes a plurality of masked regions and a plurality of unmasked regions;
the plurality of masked regions include the first masked region;
the plurality of unmasked regions include the first unmasked region; and
the first mask is configured to mask the source image across the plurality of grid regions in an alternating pattern involving the plurality of masked regions and the plurality of unmasked regions.

17. The non-transitory computer readable medium of claim 15, further comprising:
generating, via a second mask, a second masked region that masks the second source region of the protected image and a second unmasked portion that comprises the first grid region;
generating second inpainted region by inpainting the second masked region based on the first grid region;
generating second similarity data indicative of the similarity assessment between the second source region and the second inpainted region; and
generating another protected image that includes at least (i) the second masked region at a second grid region in response to the second similarity data indicating that the second source region is not similar to the second inpainted region and (ii) the second inpainted region at the second grid region in response to the second similarity data indicating that the second source region is similar to the second inpainted region.

18. The non-transitory computer readable medium of claim 15, wherein:
the first mask is configured to mask the source image at a selection of the plurality of grid regions; and
the selection is determined based on a probability value in relation to another threshold, the probability value being randomly assigned to each grid region.

19. The non-transitory computer readable medium of claim 15, wherein:
the similarity assessment includes an L2 distance calculation between first source content of the first source region and first inpainted content of the first inpainted region;
the first similarity data includes a distance that is computed based on the L2 distance calculation; and
the protected image includes (i) the first masked region at the first grid region when the distance is greater than the threshold and (ii) the first inpainted region at the first grid region when the distance is equal to or less than the threshold.

20. The non-transitory computer readable medium of claim 15, wherein the similarity assessment includes a mean squared error that is computed with respect to first source content of the first source region and first inpainted content of the first inpainted region.

* * * * *